(12) United States Patent
Wang et al.

(10) Patent No.: US 12,587,764 B2
(45) Date of Patent: Mar. 24, 2026

(54) FLEXIBLE COMPUTATIONAL IMAGE SENSOR WITH COMPRESSIVE SENSING CAPABILITY

(71) Applicant: Samsung Electronics Co., Ltd., Suwon-si (KR)

(72) Inventors: Yibing Michelle Wang, Temple City, CA (US); Chunji Wang, Pasadena, CA (US); Yanhai Ren, Pasadena, CA (US); Tze-Ching Fung, Diamond Bar, CA (US); Duhyun Lee, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 315 days.

(21) Appl. No.: 18/072,689

(22) Filed: Nov. 30, 2022

(65) Prior Publication Data

US 2023/0217128 A1 Jul. 6, 2023

Related U.S. Application Data

(60) Provisional application No. 63/295,839, filed on Dec. 31, 2021.

(51) Int. Cl.
*H04N 25/713* (2023.01)
*H04N 25/53* (2023.01)

(52) U.S. Cl.
CPC ........... *H04N 25/713* (2023.01); *H04N 25/53* (2023.01)

(58) Field of Classification Search
CPC ...... H04N 25/713; H04N 25/53; H04N 25/00; H04N 25/77; H04N 25/621; H04N 25/70; H04N 25/773; H04N 25/78; H04N 25/79; H04N 25/532

USPC .................................................... 348/207.99
See application file for complete search history.

(56) References Cited

U.S. PATENT DOCUMENTS

| | | | |
|---|---|---|---|
| 9,652,692 B1 * | 5/2017 | McGarry | G06T 7/521 |
| 9,983,135 B2 | 5/2018 | Rothberg et al. | |
| 10,362,255 B2 | 7/2019 | Johnson et al. | |
| 10,547,800 B2 | 1/2020 | Hwang et al. | |
| 10,855,896 B1 | 12/2020 | Li et al. | |
| 11,194,160 B1 | 12/2021 | Li et al. | |
| 11,348,954 B2 | 5/2022 | Wang et al. | |
| 2015/0009375 A1 | 1/2015 | Agranov et al. | |

(Continued)

FOREIGN PATENT DOCUMENTS

| | | |
|---|---|---|
| EP | 3430648 B1 | 9/2020 |
| WO | 2018201219 A1 | 11/2018 |
| WO | 2018218354 A1 | 12/2018 |

OTHER PUBLICATIONS

European Extended Search Report for Application No. 22216863.5, mailed Mar. 22, 2023.

*Primary Examiner* — Lin Ye
*Assistant Examiner* — Chan T Nguyen
(74) *Attorney, Agent, or Firm* — Renaissance IP Law Group LLP

(57) ABSTRACT

The present disclosure relates to a method and system for imaging a scene. The method includes generating a shutter pattern and applying the shutter pattern to a photodetector array. The system includes a sensor architecture in three dimensions, where elements of the sensor architecture are stacked in two or more layers. Some elements of the sensor architecture include a photodetector array, register array, a generator to generate shutter patterns, readout circuitry, and an ISP.

20 Claims, 12 Drawing Sheets

(56)     References Cited

U.S. PATENT DOCUMENTS

| | | | |
|---|---|---|---|
| 2015/0070555 A1 | 3/2015 | Guicquero et al. | |
| 2017/0041571 A1 | 2/2017 | Tyrrell et al. | |
| 2017/0134672 A1 | 5/2017 | Gibbons et al. | |
| 2018/0220094 A1 | 8/2018 | Yang et al. | |
| 2019/0189656 A1 | 6/2019 | Mo et al. | |
| 2019/0259899 A1 | 8/2019 | Matsubara et al. | |
| 2020/0204748 A1* | 6/2020 | Genov | H04N 25/77 |
| 2020/0303444 A1* | 9/2020 | Onuki | H04N 25/772 |
| 2022/0201235 A1 | 6/2022 | Wang et al. | |
| 2022/0239822 A1 | 7/2022 | Genov et al. | |
| 2022/0291347 A1 | 9/2022 | Otake et al. | |
| 2024/0088175 A1* | 3/2024 | Saito | G06N 3/063 |

* cited by examiner

FIG. 5

FLEXIBLE COMPUTATIONAL IMAGE SENSOR WITH COMPRESSIVE SENSING CAPABILITY

CROSS-REFERENCE TO RELATED APPLICATIONS

This application claims priority under 35 U.S.C. § 119 to U.S. provisional application Ser. No. 63/295,839, filed Dec. 31, 2021, entitled "A FLEXIBLE COMPUTATIONAL IMAGE SENSOR WITH COMPRESSIVE SENSING CAPABILITY", which is herein incorporated by reference in its entirety.

FIELD

The present disclosure relates generally to an image sensor with compressive sensing capabilities. It may be a computational image sensor that applies to high speed imaging, high dynamic range, motion-blur free imaging, and direct time-of-flight.

BACKGROUND

A short integration time period for multiple frame capturing may be desired in various imaging techniques, including, but not limited to: high dynamic range (HDR), high-speed imaging, time-of-flight (TOF), and motion-blur free low light imaging. Further, other systems such as 3D sensing using direct time-of-flight (DTOF) Low light imaging may have a long integration time and can accordingly suffer from motion blur caused by camera or object movement. In order to reduce or eliminate motion blur in low light imaging, a shorter integration time and multiple frame capturing can be used. These captured frames can be post-processed for object alignment first and then can be accumulated to form a motion-blur free high-quality image with a high signal-to-noise (SNR) ratio. HDR imaging can also benefit from a shorter integration time and with multiple frames, which can avoid clipping in high light regions.

With shorter integration times and multiple frames, large amounts of data can be generated, and this data needs to be both transferred and processed in a short period of time. There exists a need to efficiently store, transfer, and process this data from these image sensors.

One possible method for storing, transferring, and processing data can be to compress the data at the pixel level before reading out the data. The image can then be decompressed either on chip or off chip to recover the original multiple frames of information. For high-speed imaging, recovering the multiple frames of information may be sufficient, however, for motion-blur free low light imaging and HDR imaging, there may be more work required. The motion vectors inside these frames can be estimated first, then the objects can be aligned and the frames can be congregated to form a final image. Lastly, for 3D sensing, pixel-wise histograms can be built based on the multiple frames of information, and then the depth information can be extracted for each histogram.

Traditional compressive sensing technologies may be used. For compressive sensing, there may be patterns assigned to an image plane. These patterns may be electrical, such as a shutter pattern, or optical, such as an optical mask. These patterns may be time and/or spatially variant. The masks may need to be switched very quickly to achieve a high frame rate or to have high time-resolving capabilities. Applying different mask values for each pixel and at each frame at high speeds may be difficult. Storing the values of the random masks for each pixel frame may also require a lot of memory. The previous examples may be for background and orientation purposes only, and may contain concepts developed by the inventors that are not prior art.

SUMMARY

According to one example embodiment, provided is a sensor, comprising: a photodetector array located on a first die layer, a register array located on a second die layer, a row select driver, a column readout, a pattern generator, an image signal processor, wherein the first die layer is stacked on the second die layer.

According to another example embodiment, provided is a method for imaging, comprising: generating a shutter pattern on a first die layer, sending the shutter pattern to a register array on the first die layer, outputting control signal values from the register array to switches in a photodetector array on a second die layer, enabling charge accumulation in photodetectors in the photodetector array when the control signal values are set to enable, disabling charge accumulation in photodetectors in the photodetector array when the control signal value are set to disable, and reading out the accumulated charge values on the first die layer.

According to another example embodiment, provided is a sensor, comprising: a photodetector array on a first die layer, a register array on a second die layer, a memory array, an image signal processor, a row driver, a pattern generator, and a column readout.

BRIEF DESCRIPTION OF THE DRAWINGS

The following description and examples illustrate embodiments of the invention in detail. It is to be understood that this invention is not limited to the particular embodiments described herein and as such may vary. Those of skill in the art will recognize that there are numerous variations and modifications of this invention, which are encompassed within its scope.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5 depicts an example pixel array.

DETAILED DESCRIPTION OF THE DRAWINGS

Figure 1:
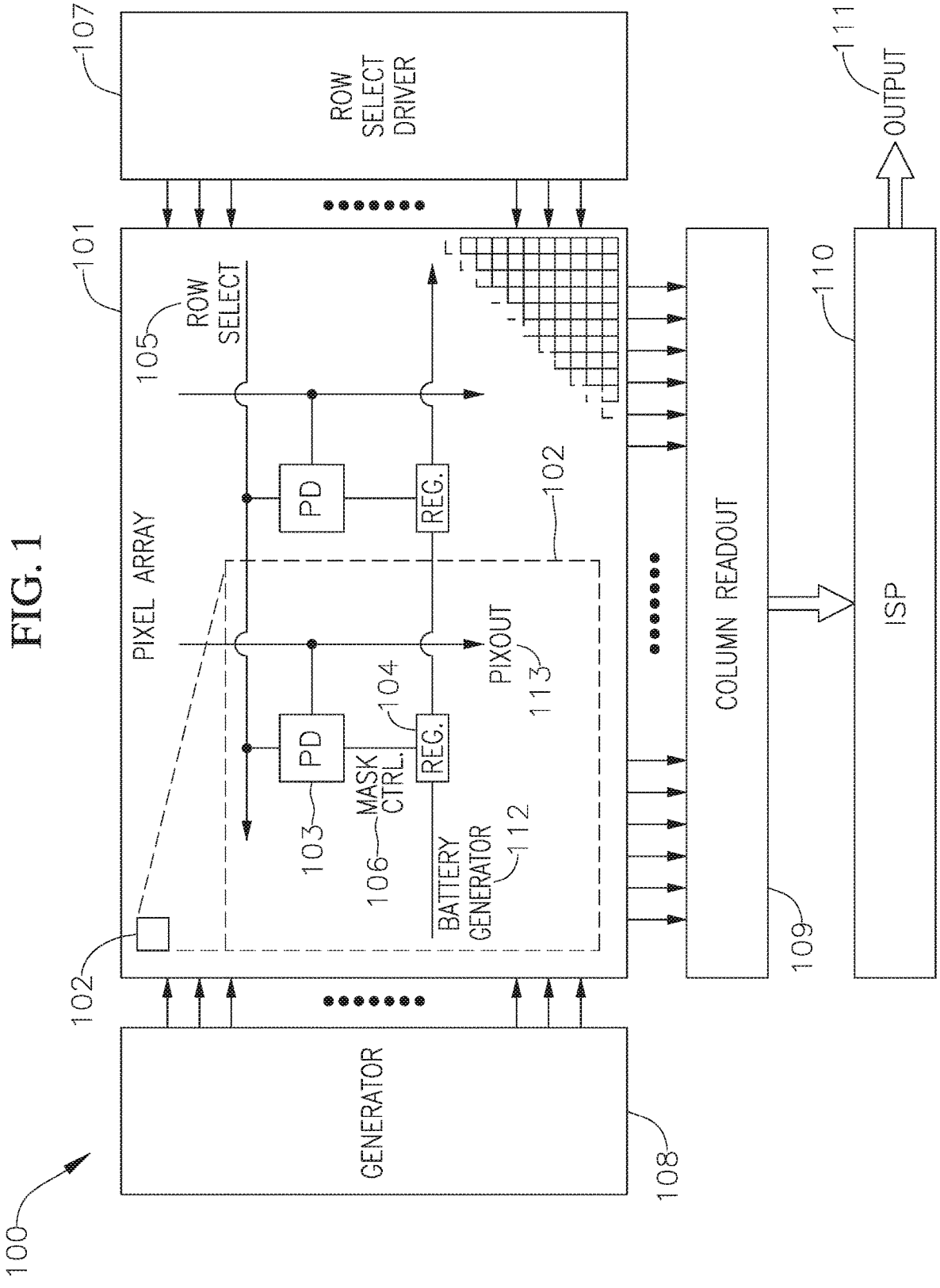
FIG. 1 depicts an example sensor of an example embodiment.

Hereinafter, example embodiments will be described in more detail with reference to the accompanying drawings, in which like reference numbers refer to like elements throughout. The present disclosure however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. The term "diameter" as used herein may refer to the diameter of a circular or spherical shape, or the equivalent diameter of a non-circular or non-spherical shape.

FIG. 1 depicts an example sensor 100 of an example embodiment. Sensor 100 may be a sensor architecture. Sensor 100 may be sized at few millimeters in length, height (not shown), and width, but it may be smaller or larger. Sensor 100 may be a stacked sensor with multiple dies stacked vertically. Each of these stacked dies may be known as a stacked layer. A stacked layer may be a single die.

There may be a pixel array 101, which may comprise one or more pixels 102 that may be arranged in N rows by M columns, where N and M are integer values greater than or equal to one. Pixels 102 in pixel array 101 may be constructed of circuitry found in one or more stacked die layers. A die can be vertically stacked on another die either vertically or with an intermediate or interposed die, or various other arrangements. The die may be stacked as a die, or they may be stacked before dicing (EG, as wafers). For example, there may be a photodetection element 103 of a pixel 102 that may be found on one die layer, and readout elements of pixel 102 may be found on another die layer. The layering configurations of pixel array 101 will be described in more detail later.

Focusing on one example pixel 102 of pixel array 101, pixel 102 may comprise one or more photodetectors (PDs) 103. Additionally, pixel 102 may include zero or more registers 104. A pixel with more than one photodetector 103 may be known as a shared pixel. A shared pixel may sum the values or charges accumulated together to have one output value, or it may have two separate outputs, one for each photodetector. Register 104 may receive a pattern 112 sent from a pattern generator 108. Register 104 may output a control signal 106 to photodetector 103 to enable or disable the output of photodetector 103.

Photodetector 103 may be any suitable photodetector for a target wavelength range of any part of the electromagnetic spectrum. The present embodiments refer to a visible spectrum of light, however, light may be understood to be any wavelength in the electromagnetic spectrum. For example, light may include near-infrared, short-wave infrared, long-wave infrared, and/or ultraviolet.

A row select signal 105 may be sent to a row of pixels containing pixel 102 in pixel array 101. Row select signal 105 may be sent from a row select driver 107. Row select signal 105 may select the row of pixels containing pixel 102 and enable pixel 102 to send data to pixel output 113. Pixel output 113 may be a voltage that may be used to determine a photodetection event or light intensity. Pixel output 113 may be sent to column readout 109. Pixel output 113 may be an output connecting a column in pixel array 101, for example, the column of pixels containing pixel 102. The output value of pixel 102 may be a charge that accumulated from photodetector 103 or may be a binary value (1 or 0, high or low, detection or no detection).

Moving away from the details of pixel 102 and back to the sensor 100, row select driver 107 may be used to enable reading out a row of pixel values. Row select driver 107 may select one or more of the N rows of pixels in pixel array 101. When a row of pixels in pixel array 101 is selected, the values of the pixels (a stored charge or a binary value) may be sent to a column readout 109.

Column readout 109 may read pixel values from all columns and one or more of the row(s) of pixels selected by row select driver 107. For example, three rows of pixels in pixel array 101 may be selected, and column readout 109 may receive readout pixel values from three rows of pixels for each column of pixel array 101.

There may be a pattern generator 108 connected to pixel array 101. In one embodiment, pattern generator 108 may be a memory. In such an embodiment, pattern generator 108 may store one or more pre-loaded shutter patterns. In some embodiments, a shutter pattern may be a binary pattern that may map onto the pixel array 101. The binary value may be used to control a readout status of individual pixels 102 in pixel array 101. For example, the readout status may be to read or to not read a pixel 102, depending on the value of the shutter pattern mapped onto that specific pixel 102.

Pre-loaded shutter patterns may be generated in a separate location and loaded into pattern generator 108. Shutter patterns may then be loaded into the registers 104 of pixels 102 in pixel array 101, corresponding to the bits mapped thereon in the shutter pattern.

A shutter pattern may be used to compress an image, which may be known as compressive or compressed sensing. The shutter pattern may be used in an algorithm that compresses an image or sequence of images, which algorithm may operate spatially, temporally, or spatial-temporally. The shutter pattern may be electrical, optical, or both, which will be described in more detail later.

In another embodiment, pattern generator 108 may actively generate shutter patterns. Generated shutter patterns may be generated in pattern generator 108, which may also be known as on-chip generation or online generation. The distribution of shutter patterns, and control of pixels, would thence be similar to that expressed above.

In both embodiments, generated shutter patterns may be random or pseudo-randomly generated. A pseudo-randomly generated pattern may also be known as a deterministic random bit generator. The shutter pattern may be approximately random, and any method to generate pseudo-random patterns may be used. In other embodiments, the pattern may be not random. For all shutter patterns described below, the shutter patterns may be random or pseudo-random in both the spatial and temporal domains.

The shutter patterns described below may be a binary pattern (random or pseudo-random) of ones and zeros that may be applied to a pixel, array of pixels, and/or multiple frames of pixels. The shutter pattern may be applied to pixel values over a period of time and the final output value may be the weighted sum of the pixel values. The weighted sum may be a compressed output and may be in a temporal, spatial, or spatial-temporal domain. The compressed output may have an associated compression ratio. The compression ratio will be described in subsequent sections for temporal, spatial, and spatial-temporal compression.

In one embodiment, the shutter pattern may be an array of binary values that are the same dimension of an image in pixel array 101. That is, if there are H by W pixels, there may be H by W shutter values in the shutter pattern for one frame. For M frames, there may be H by W by M shutter values in the shutter pattern.

The shutter pattern may change for each clock cycle, or every other clock cycle, or any other sequence. For example, if an image is H by W with M frames, there may be M shutter patterns. Thus, for each frame, the shutter pattern may change. When an image readout occurs on the M-th frame, there may be one readout. The one readout may be a compression from M frames into one readout frame. A temporal compression ratio may therefore be M. During reconstruction, the compressed image may be reconstructed to M frames. This form of shutter patterns may be known as temporal compression.

In another embodiment, the shutter pattern may comprise multiple subarrays of shutter patterns. Each subarray shutter pattern may be pseudo-randomly generated. For example, for an image H by W with 1 frame, there may be a subarray shutter pattern of dimensions square root sqrt (B) by sqrt (B), where B may be a patch size. This subarray shutter pattern may also be known as a patch.

There may be a subarray of multiple shutter patterns of dimension sqrt (B) by sqrt (B) applied across the image of size H×W. For example, if B=4, the subarray shutter pattern dimensions may be 2 by 2 pixels. If H and W are both 4, then there may be a total of 4 separate 2 by 2 subarray shutter patterns (patches) applied to the image, where each subarray shutter pattern may be pseudo-randomly generated. From a subarray shutter pattern that is 2 by 2 pixels, the output readout size may be 1 pixel. This example may have a spatial compression ratio of 4 (from 4 pixels there may be an output of 1 pixel). That is, for a subarray shutter pattern, the one or more photodetectors related to the subarray shutter pattern may lead to a reduced output size when reading out photodetector values. Therefore, there may be a reduction in pixel count for the output readout image from an input image of 4 by 4 to an output image of 2 by 2. The compressed output may be a weighted sum, which may be a weighted sum applying a patch (subarray shutter pattern) to sqrt (B) by sqrt (B) pixels in the pixel array 101, which may result in an output of one value. The frame rate may remain the same, that is, one input frame may result in one output frame. This form of shutter patterns may be known as spatial compression.

In yet another embodiment, the shutter pattern may comprise a combination of temporal and spatial compression. Each frame readout may be spatially compressed. For each frame readout, a different series of subarray shutter patterns may be used. The output frames may be a series of multiple frames all smaller in size than the original input frames. By extending the example of the spatial patch of 2×2 and the temporal compression of M frames, the spatial-temporal compression ratio may be 2×2×M, or 4M. That is, from 2×2×M pixels, the compression output may be the weighted sum of the 2×2×M pixels and may be one output value. Thus, for a patch size of X by Y with M frames, the compression ratio may be X by Y by M.

As described previously, a column readout 109 may be connected to pixel array 101. An image signal processor (ISP) 110 may be connected to column readout 109, which may provide an output 111 for off-chip processing. Column readout 109 may include capacitors to store pixel values, an analog-to-digital (ADC) converter to convert analog values to digital values, digital memory to store converted digital numbers, and other components (not shown).

The sensor 100 of FIG. 1 may be an example architecture of an example embodiment. The following figures will describe example components of architecture 100, as well as example data flow, hardware design, and operation.

Figure 2:
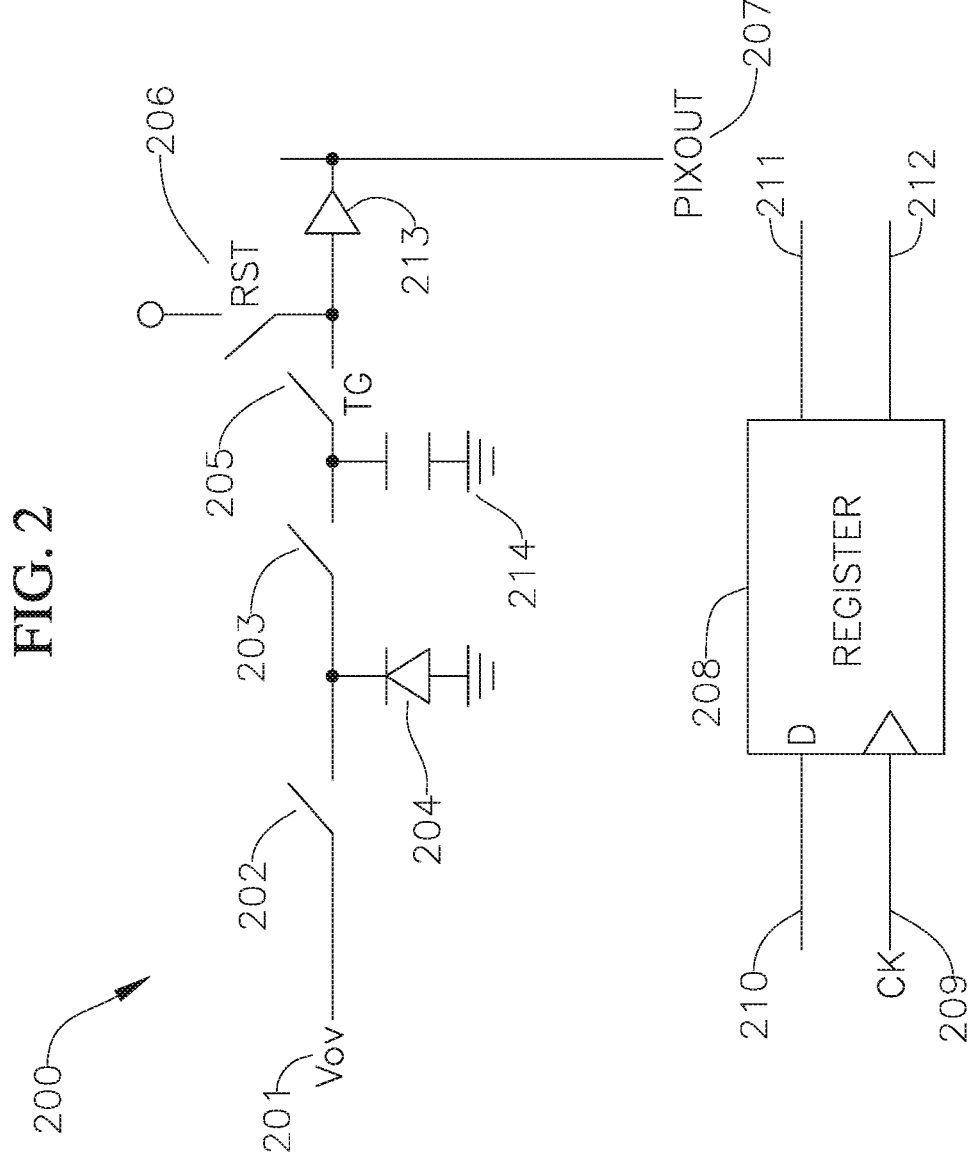
FIG. 2 depicts an example pixel of an example embodiment.

FIG. 2 depicts an example pixel 200 of an example embodiment. Pixel 200 may be a pixel such as pixel 102 in pixel array 101 of FIG. 1. Pixel 200 may include a circuit with a photodetector 204. Photodetector 204 may be a photodiode, but may be any other suitable photodetector for a target wavelength range of any part of the electromagnetic spectrum. In some embodiments, photodetector 204 may be single photon avalanche diode (SPAD), quanta image sensor (QIS), photodiode, or any other photodetector. Pixel 200 may be responsible for charge accumulation as well as sending a voltage output during readout. Photodetector 204 may be responsible for photon conversion into photoelectrons or charge.

A first switch 202 may be used to open and close a connection in pixel 200. When the first switch 202 is in the closed position, charge generated from photodetector 204 may be sent to a node 201. Node 201 may connect to an overflow voltage (Vov), which may be considered a drain. When first switch 202 is closed, pixel 200 may not be able to accumulate charge because photodetector 204 may be dumping charge into node 201. When first switch 202 is open, pixel 200 may be able to accumulate charge. First switch 202 may be controlled by the shutter pattern described previously: when a shutter pattern value for pixel 200 is set to off (don't read), first switch 202 may close. When a shutter pattern value for pixel 200 is set to on (read), first switch 202 may open. As described next, there may be other switches in pixel 200 that may work together with first switch 202.

A second switch 203 may be used to open and close another connection in pixel 200. Building on the description of the operation of first switch 202, when the second switch 203 is in the closed position and the first switch 202 is in the open position, pixel 200 may be able to accumulate charge at the capacitor 214. When the second switch 203 is in the open position, photon detected using photodetector 204 may be accumulated at the photodetector 204. A shutter pattern from pattern generator 108 of FIG. 1 may be used as control signals to control first switch 202 and second switch 203, or other control signals may be used. In some embodiments, second switch may not be added to pixel 200, that is, first switch 202 may be used to control the reading or not reading of pixel 200. There may be a select switch in pixel 200 (not shown) that may enable readout.

There may optionally be a capacitor 214 and optionally a transfer gate 205 that together may enable a charge accumulation circuit with in pixel 200. When first switch 202 and transfer gate 205 are open, and second switch 203 is closed, charge may accumulate on photodetector 204 and/or capacitor 214, which may be known as a floating diffusion region or node. When transfer gate 205 is present, a correlated double sampling readout option may be used for reading out. When transfer gate 205 is not present, a pseudo-correlated double sampling option may be used for reading out. In both instances, a pixel select (not shown) may be used to enable reading out pixel 200.

As described previously, transfer gate 205 may not need to be in pixel 200. When transfer gate 205 is not in pixel 200, the combination of first switch 202 being open and second switch 203 being closed may enable charge accumulation and reading out charge accumulated in photodetector 204 (along with a pixel select, not shown).

Stored charge, or voltage, may be read out when row select driver 107 of FIG. 1 selects the row that pixel 200 is found in a pixel array such as pixel array 101 of FIG. 1. Going back to FIG. 2, when transfer gate 205 and second switch 203 are closed, and first switch 202 is open, pixel 200 may be read (along with a pixel select, not shown). The charge from photodetector 204 that accumulated may flow through an amplifier 213 and to output 207. Pixel 200 may have an amplifier 213 as a circuit component, and it may be used as a one-way switch for current.

Pixel 200 may have a reset switch 206 which may be used to reset the charge accumulated in photodetector 204. Charge may be dumped when reset switch 206 is closed. In some embodiments, reset switch 206 may be a quenching circuit.

Output value 207 may be the output value of pixel 200. Output value 207 may be a charge level in voltage form, which may be converted later to a digital output, such as 1 or 0, or high or low, or on or off. When output value 207 is on, pixel 200 may have detected a photon of light. When output value 207 is off, pixel 200 may have not detected a photon of light or may have had the value of photodetector 204 masked. First switch 202 may be driven closed and second switch 203 may be driven to mask the value of photodetector 204. Masking a value may mean to block the output value 207 (by opening switch 203 or dumping via switch 202) to deliberately signal no photodetection (i.e. a zero or an off value).

There may be a register 208 associated with pixel 200 that may be responsible for controlling the operation of pixel 200. There may be a control signal 210 and a clock signal 209 as inputs into register 208. Control signal 210 may be an output from pattern generator 108 of FIG. 1 and may be a portion of the shutter pattern corresponding to the pixel 200. Control signal 210 may change as often as once per clock cycle (sent by clock signal 209), but may change less frequently, such as once per every two clock cycles, or even less frequent. Control signal 210 may go into register 208 and may transfer the control signal to one or more output signals, shown as first signal 211 and second signal 212.

There may be a first signal 211 and second signal 212 as output signals of register 208. The signals 211 and 212 may be used to control first switch 202 and second switch 203, respectively. There may be a connection between the output signals 211 of register 208 and the first switch 202. There may also be a connection between the output signal 212 of register 208 and second switch 203. In an example embodiment, signals 211 and 212 may be opposites of each other. That is, when register 208 generates an "on" signal for first signal 211, second signal 212 may be an "off" signal. Subsequently, First signal 211 being "on" may close first switch 202 and second signal 212 being "off" may open second switch 203. As a result, photodetector 204 may not accumulate charge and pixel 200. This scenario may be when a shutter value (sent via control signal 210) is set to not reading a pixel.

In another scenario, when a shutter value is set to reading a pixel, register 208 may generate a first signal 211 set to "off" and may open first switch 202. Register 208 may also generate a second signal 212 set to "on" and may close first switch 203. Charge may then accumulate for photodetector 204 and the voltage signal may be sent to output 207. Optionally, if transfer gate 205 is present, transfer gate 205 may need to close before an output signal is sent to output 207.

Furthermore, register 208 may be used to propagate part of the shutter pattern generated from pattern generator 108 of FIG. 1. For example, if pixel 200 is the first pixel in a row and column of a pixel array 101 of FIG. 1, a new shutter pattern value may be loaded into register 208 one cycle at a time, and the previous shutter pattern value may be sent to the next pixel in the row. Thus, the output of register 208 may be used as a control signal/input (not shown) of a next register associated with a next pixel (not shown). There may be a clock speed for propagating shutter pattern values. In an example embodiment, the clock speed may be the final frame rate F multiplied by the compression ratio M. For example, with a temporal compression ratio of M=8 and a frame rate of 30 frames/second, the clock speed may be 240 Hz. Other embodiments may have a higher or lower clock speed.

Together, the circuitry of pixel 200 may be used to detect photons at the pixel level in pixel array 101 of FIG. 1. In an example embodiment, pixel 200 may be a pixel 102 of FIG. 1. That is, in sensor 100 of FIG. 1, pixel array 101 may be an array of pixels like pixel 200 where there are single or shared photodetectors within each pixel, and a register within each pixel (or set of pixels). The physical location of the components of pixel 200 of FIG. 2 may be together on the same chip, on multiple layers of a chip (also may be known as stacked), or a combination of on-chip and off-chip. The location of the physical components of pixel 200 will be described later.

Figure 3:
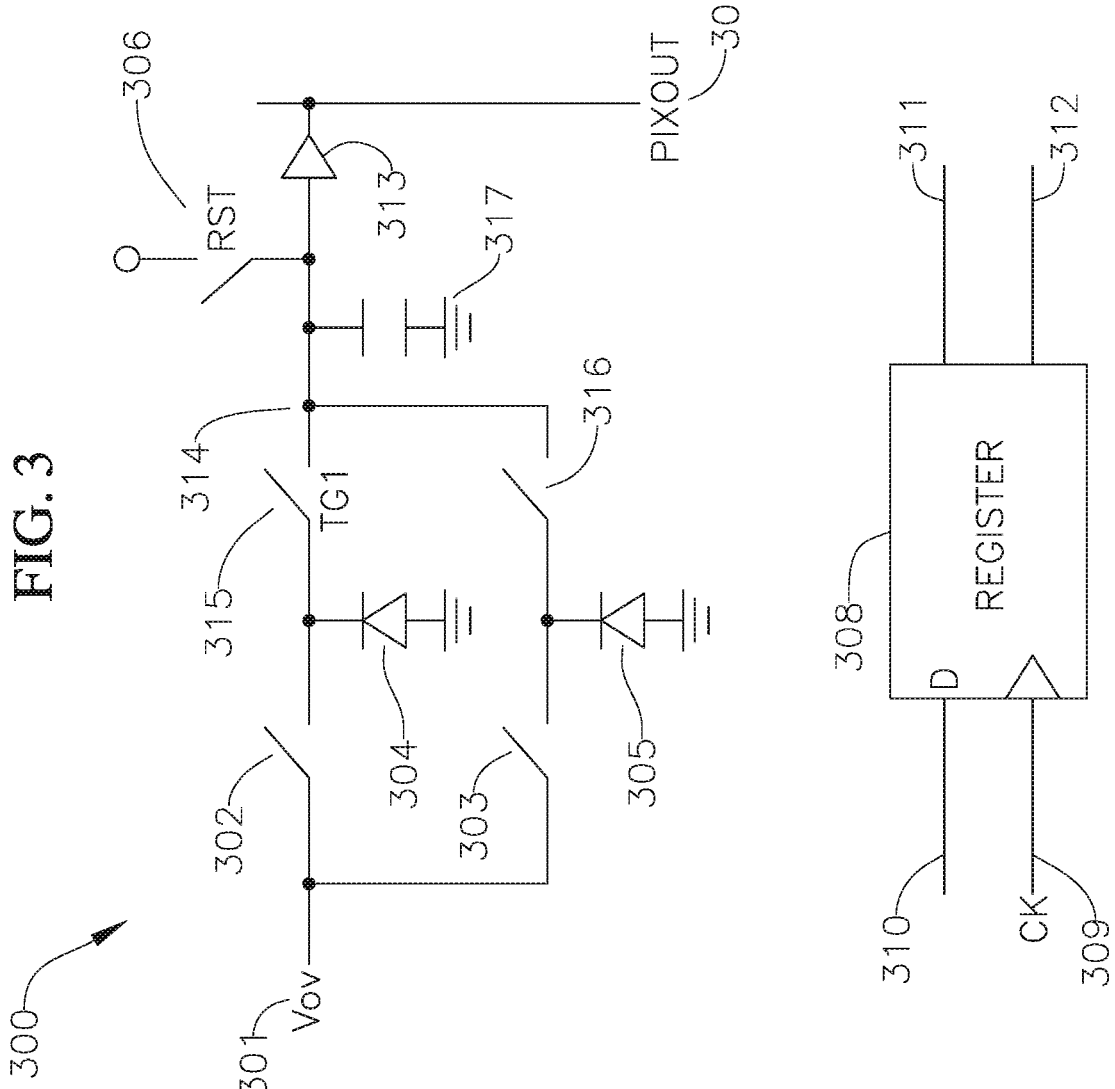
FIG. 3 depicts another example pixel that may be used in the pixel array of FIG. 1.

FIG. 3 depicts another example pixel 300 that may be used in pixel array 101 of FIG. 1. There may be one or more photodetectors in a pixel 300. In the example embodiment of FIG. 3, there may be two photodetectors 304 and 305, which may be known as a shared pixel. It may also be known as a 1×2 (one by two) shared pixel, where the pixel may have one column and two rows of photodetectors. In other embodiments, there may be more photodetectors in pixel 300. The photodetectors may be arranged in any number of rows and columns, for example 1×2, 2×1, 2×2, 3×2, and so on.

FIG. 3 may have components with similar functionality to FIG. 2, with the exception of an additional photodetector. There may be a first switch 302 that when closed may connect a first photodetector 304 with a node 301. There may be a first transfer gate 315 that may be used to read out the charge accumulated with photodetector 304. There may be a second switch 303 that when closed may connect a second photodetector 305 with node 301. Node 301 may have an overvoltage that may be used as a sink for photodetectors 304 and 305 when switches 302 and 303 are closed, respectively.

There may be a capacitor 317 to enable charge accumulation. Additionally, there may be a first transfer gate 315 and a second transfer gate 316. The operation of the transfer gates 315 and 316 may be similar to the transfer gate 205 described in FIG. 2.

In some embodiments, pixel 300 may have an integer n>1 photodetectors, and there may be up to n output signals for the register 308. In the example pixel 300, there are n=2 photodetectors and two output signals for register 308. Whatever the number of photodetectors there may be in a pixel 300, there may be fewer or the same number of output signals for a register 308. For example, register 308 may have a first signal 311 and a second signal 312 for each photodetector 304 and 305, respectively. First signal 311 and second signal 312 may be complimentary in values (one is high, the other low and vice versa) or may be the same (both are high or both are low).

In an example embodiment, register 308 may be used to send control signals to transfer gates 315 and 316. For example, first signal 311 may be used to control first switch 302 and second transfer gate 316. Second signal 312 may be used to control second switch 302 and first transfer gate 315. The two signals 311 and 312 may be opposite values to each other. That is, when a shutter pattern is sent to register 308 via control signal 310, one of the photodetectors 304 or 305 may be enabled for charge accumulation in pixel 300 while the other photodetector may be disabled for charge accumulation.

In other embodiments, first signal 311 may only be sent to control first switch 302 and second signal 312 may only be sent to control second switch 303. Transfer gates 315 and 316 may be controlled by other circuitry not shown.

There may be a floating diffusion node 314, which may be the storage of accumulated charge for pixel 300 when photodetectors 304, 305, or both are enabled. When pixel 300 is read, charge may flow through amplifier 313 to output 307. There may be a pixel select (not shown) to enable reading out pixel 300.

Figure 4:
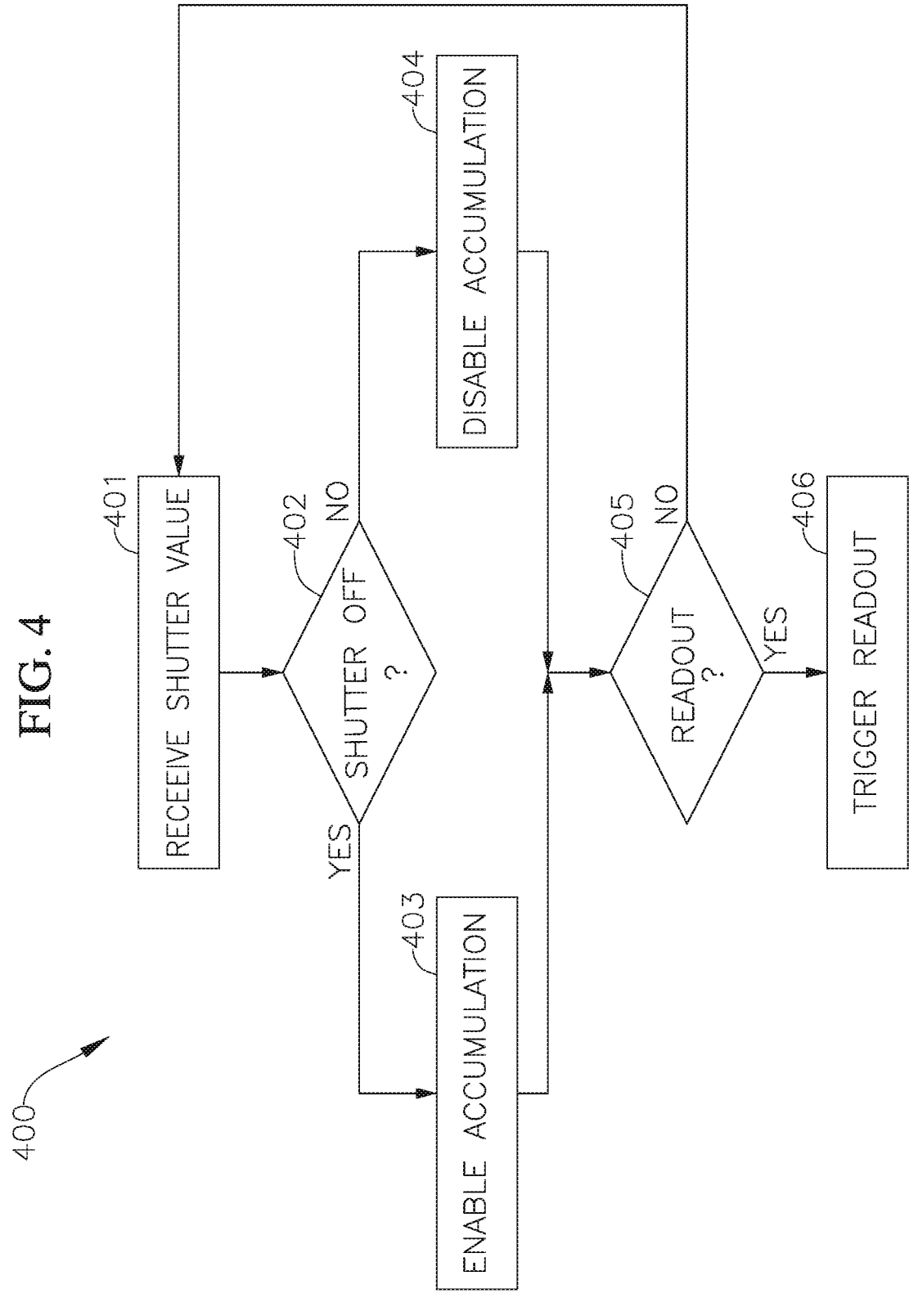
FIG. 4 depicts process of an example order of operations for a pixel in the pixel array of FIG. 1.

In both pixel 200 of FIG. 2 and pixel 300 of FIG. 3, there may be an order of operations performed for applying a shutter pattern, enabling accumulation, and reading out charge. FIG. 4 depicts this order of operations.

FIG. 4 depicts process 400 of an example order of operations for a pixel in pixel array 101 of FIG. 1. The pixels describe in FIGS. 2 and 3 may use this logic when using shutter values, accumulating charge, dumping charge, and reading out charge.

Step 401 may involve receiving a shutter value at a pixel. A shutter value may be sent from pattern generator 108 of FIG. 1. The shutter value may be received by a register such as register 208 of FIG. 2. As will be described in more detail later, the shutter value may also be received from another register associated with another pixel, which in turn receives the value from pattern generator 108. As described previously, pattern generator 108 may provide a shutter value pattern that is sent to registers within pixels, and those registers may propagate the shutter value pattern to connected registers until all registers in pixel array 101 receive a shutter value pattern.

Once the shutter value in step 401 is received at a pixel, step 402 may occur. In step 402, the pixel may transfer the shutter value with a register such as register 104 of FIG. 1 or register 208 or 308 of FIG. 2 or 3, respectively. The register may send a control signal to a switch associated with a photodetector in the pixel. In some embodiments, the pixel may have more than one photodetector. If there is more than one photodetector, the register may send a control signal to each of the switches associated with each of the photodetectors in the pixel.

The shutter value received by a pixel in step 401 may be timestamped by a clock cycle. For each clock cycle, step 401 may send a new shutter value to a pixel, but the value may change in more than one clock cycle, such as two, three, or more cycles. For all subsequent steps, each step may be performed once per clock cycle, except for reading out.

When the register in step 402 transfers the shutter value and sends a control signal to a switch in the pixel, the value may be set to enable charge accumulation 403 for the pixel. When the value is set to enable charge accumulation, charge accumulation for the pixel may occur. Charge accumulation 403 may last for as long as step 402 sends a signal to continue to accumulate charge in the photodetector. This may occur for one or more clock cycles and when the shutter value is set to on, or read.

In some embodiments, the pixel may have more than one photodetector, and step 403 may enable charge accumulation in the pixel for each photodetector where the associated control signal is set to on, or read.

When the register in step 402 checks the shutter value and the value is set to off or don't read, step 404 may disable charge accumulation for the pixel. Disabling charge accumulation may last for as long as step 402 sends a signal to continue to not accumulate charge in the photodetector. This may occur for one or more clock cycles and when the shutter value is set to off or don't read.

In some embodiments, the pixel may have more than one photodetector, and step 404 may disable charge accumulation for each photodetector where the associated control signal is set to off or don't read.

Step 405 may check if a pixel should be read out. As shown in FIG. 1, a readout may occur when row select driver 107 sends a signal to pixels in a row and selects the pixels for reading out. When row select driver 107 does not send a readout signal, step 405 may loop back to step 401. When row select driver 107 sends a readout signal, step 405 may lead to step 406.

Step 406 may readout the value of a pixel. A pixel may be read out both when it has or has not accumulated charge. If a pixel has accumulated charge, a voltage output signal like output 207 of FIG. 2 may be sent that may send a signal to a column readout 109 that may be further processed by an ISP 110 and result in an output 111 that denotes photons have been detected. After readout is complete in step 406, process 400 may repeat itself unless imaging is complete. When readout is complete, a reset or quenching may occur in the pixels to reset their charge. For example, reset switch 206 of FIG. 2 may close to remove accumulated charge and then open before moving back to step 401.

Figure 5:
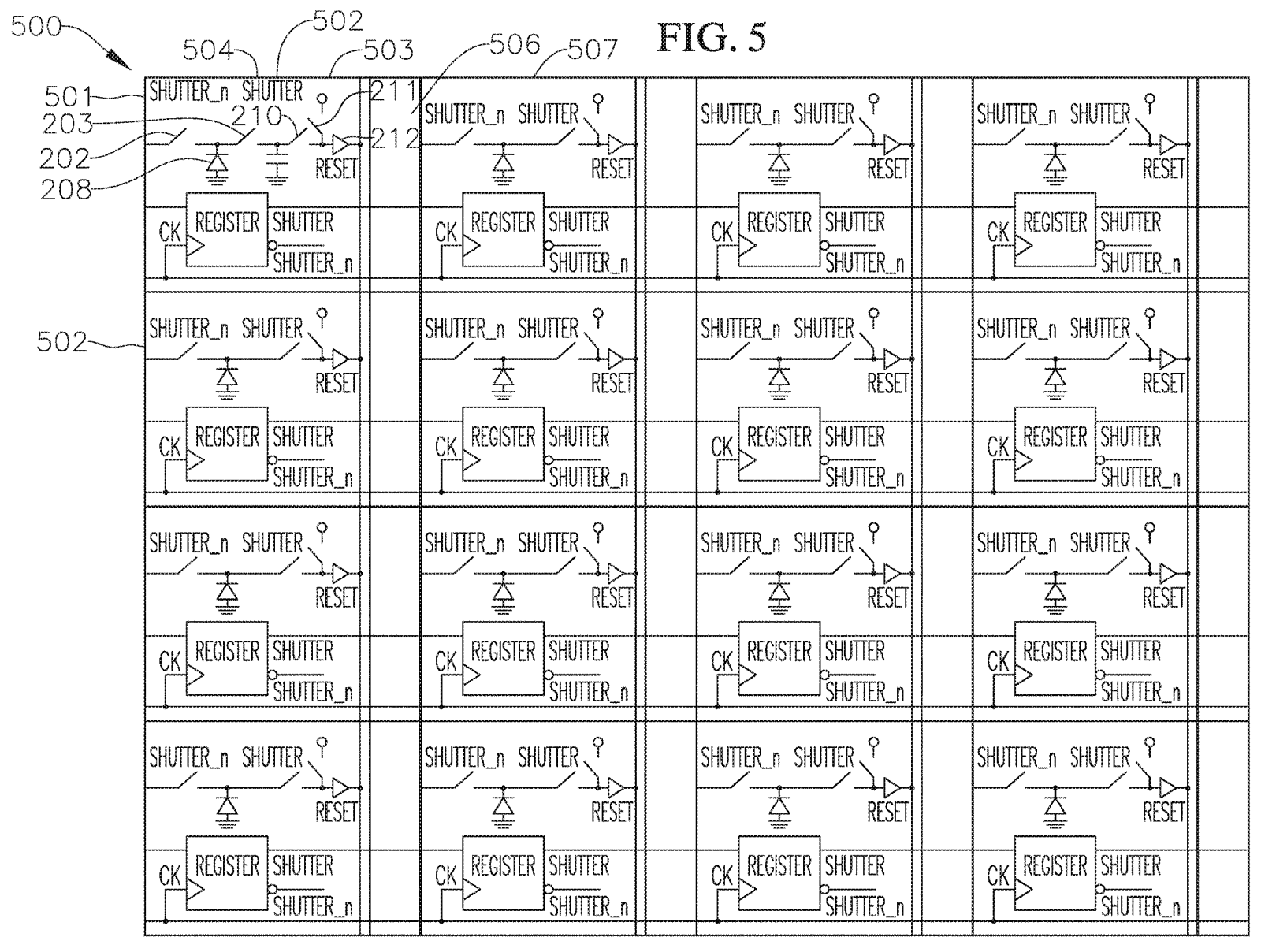

FIG. 5 depicts an example pixel array 500. In the example pixel array 500 of FIG. 5, there may be four rows and four columns of pixels, that is, there may be 16 pixels. Each pixel in pixel array 500 may use the same configuration as described in FIG. 2. Elements in the example embodiment are similar to FIG. 2 and FIG. 1. Pixel array 500 may be used in sensor 100 of FIG. 1 as pixel array 101. In an example embodiment, the pixels in pixel array 500 may use one photodetector, however, any pixel type (shared or single photodetector) may be used.

Pixel 501 may be a pixel in pixel array 500, and may be the first row, first column pixel. Pixel 501 may have one photodetector, and a register Pixel 501 may have a register output that may propagate a shutter pattern to a neighboring pixel in its row.

Pixel 502 may be another pixel in pixel array 500, and may be the second row, first column pixel. Pixel 502 may have a register output that may propagate a shutter pattern to a neighboring pixel in its row.

A column readout line 503 may connect the output of pixel 501 and pixel 502. During a column readout event, there may be values for each pixel in a given column read out in sequential order. The values may be voltage signals. In an example embodiment, the voltage signal may be linearly correlated to the charge accumulated inside each pixel. For example, in the first column, there may be four pixels (on pixel per row). Once a row is selected for reading out (not shown), there may be a column readout event. During a column readout event, the voltage signals from all pixels may be read out sequentially. The first, second, third, and then fourth pixel may be read out. The charge data may be stored in a column readout such as column readout 109 of FIG. 1. The data may then be read by an ISP layer such as ISP 110 of FIG. 1 which may be used for image reconstruction, color processing, or other task, which may depend on the type of pixels in pixel array 500 and application.

Pixels in pixel array 500 may be loaded with a shutter pattern. When the pixels in the first row are selected, a control signal 305 may be sent to the pixels (and may be received by their registers) to apply a mask pattern. As seen in pixel 501, a register 208 may receive a control signal 210 and provide two outputs similar to FIG. 2. In FIG. 2, —the first signal 211 may be to control the first switch 202 and the second signal 212 may be to control the second switch 203. In the example pixels in pixel array 500, the register may have complimentary outputs, which may be one example embodiment of register 208 from FIG. 2. That is, when the first signal 211 is high, the second signal 212 is low. When the first signal 211 of the register 208 is set to high, the first switch 202 may be closed and the second switch 203 may be open, which may not allow for charge to accumulate in the pixel. When the first signal 211 of the register 208 is set to low (and therefore second output 212 set to high), the first switch 202 may be open and the second switch 203 may be closed, when may allow for charge to accumulate in the pixel.

The output of the register 208 may be used as the input to a register 508 of the third pixel 507, which may be the pixel next to pixel 501. That is, the shutter pattern may propagate from the register in one pixel to the register in another pixel until all registers in the pixel array 500 hold shutter pattern values. For example there may be a connection 506 that connects a first signal output of a register 208 associated with pixel 501 to a control signal input of a register 508 associated with the pixel 507, which may be in the first row, second column of pixel array 500. A similar connection may exist between other pixels, where the previous pixel in a row may have a first output signal that connects to the control signal input of a register associated with the next pixel in the same row.

Pixel array 500 may be physically designed to fit on one layer of a die, or it may be designed to fit on multiple die layers. The components of pixel array 500 may be separated to allow for a denser fill factor. Fill factor may be the area of photodetectors divided by the total surface area of pixel array 500. When all components of a pixel (i.e. photodetector, switches, register, etc.) are on a single layer, the fill factor may be lower than when components of a pixel are on multiple layers. For example, only the photodiodes of pixel array 500 may be found on first layer (which may result in a higher fill factor), and the registers of pixel array 500 may be found on a second layer. The two-dimensional cross sectional area (along the plane of the photodetectors) may be smaller in the multi-layer configuration than in the single layer configuration. This may allow for a more compact sensor. Alternatively, this may allow for more photodetectors within a given footprint area. This three-dimensional design will be described next.

Figures 6A, 6B:
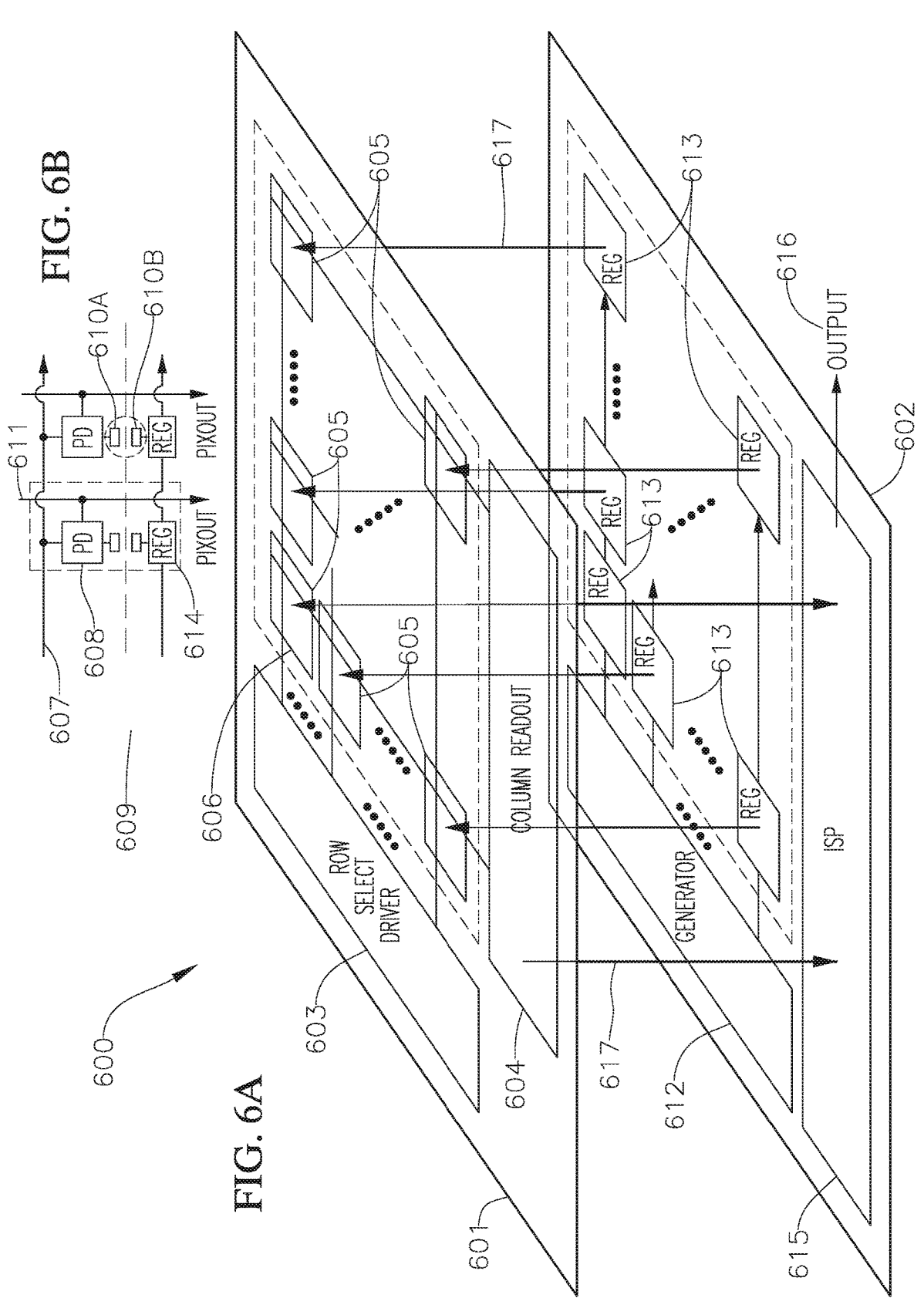
FIG. 6A depicts an example stacked architecture of a sensor architecture.
FIG. 6B depicts a pixel that may be a pixel in FIG. 6A.

FIG. 6A depicts an example stacked architecture 600 of a sensor architecture. Stacked architecture 600 may have a smaller two-dimensional cross section than a non-stacked architecture and may be because the elements of the architecture can be packed in three dimensions. Stacked architecture 600 may be one example of a three dimensional (3D) stacking of two layers and may use analog pixels/photodetectors, such as CIS, QIS, or CCD. In some embodiments, there may be two layers in stacked architecture 600. In some embodiments, all layers may be found physically on in the same package. In another example embodiment, stacked architecture 600 may be for an analog-pixel using a photodiode.

Stacked architecture 600 may have a first die layer 601 and a second die layer 602. First die layer 601 may be stacked on second die layer 602. First die layer 601 may include a row select driver 603, a column readout 604, and a photodetector array 605. There may be connectors 617 connecting first die layer 601 to second die layer 602. In some embodiments, connectors 617 may be microbumps, micropillars, solder balls, or hybrid bonding between the two layers 601 and 602.

Photodetector array 605 may be an array of photodetectors physically located on first die layer 601. There may be a register array 613 on the second die layer 602 that, together with photodetector array 605, may be a pixel array such as the pixel array 500 of FIG. 5.

Second die layer 602 may include a pattern generator 612, register array 613, ISP 615, and output 616. Between layers 601 and 602 there may be a connector array 617, which may form electrical connections between elements of layer 601 and layer 602.

Together, all elements in architecture 600 may form a more compact sensor compared to a single layer sensor architecture. By layering the elements on two or more layers, the photodetector array 605 may have a higher fill factor, which may allow for higher sensitivity photodetection. Further, this arrangement allows for the use of different process nodes for each layer of architecture 600, or the process nodes may be the same. While architecture 600 shows two stacked layers, there may be more stacked layers, which may be discussed in FIG. 7.

Focusing into the inset, FIG. 6B is a pixel 606 that may be a pixel in in the pixel array that may be configured physically in two layers: one layer may be in photodetector array 605 and a second layer may be in register array 613. As shown in the inset, pixel 606 may include a row select line 607, a column readout 614, photodetector 608, a connector 610a, a connector 610b, a shutter pattern 609, and a register 614.

In some embodiments, pixel 606 may have some components on first die layer 601 and other components on second die layer 602. In an example embodiment, components of pixel 606 that may be found on first die layer 601 may include photodetector 608, row select line 607, column readout 614, and a top half of connector 610a. Components of pixel 606 that may be found on second die layer 602 may include register 614, housing shutter pattern 609, and a bottom half of connector 610b. Connectors 610a and 610b may be the top and bottom half of one connection of connectors 617 between two die layers 601 and 602. Similarly, connectors 617 may have top and bottom half connectors (not shown). In some embodiments, connectors 610a and 610b may be a microbump, micropillar, solder ball, hybrid bond, or any other form of connection that allows for electrical contact between physical die layers.

Figure 7:
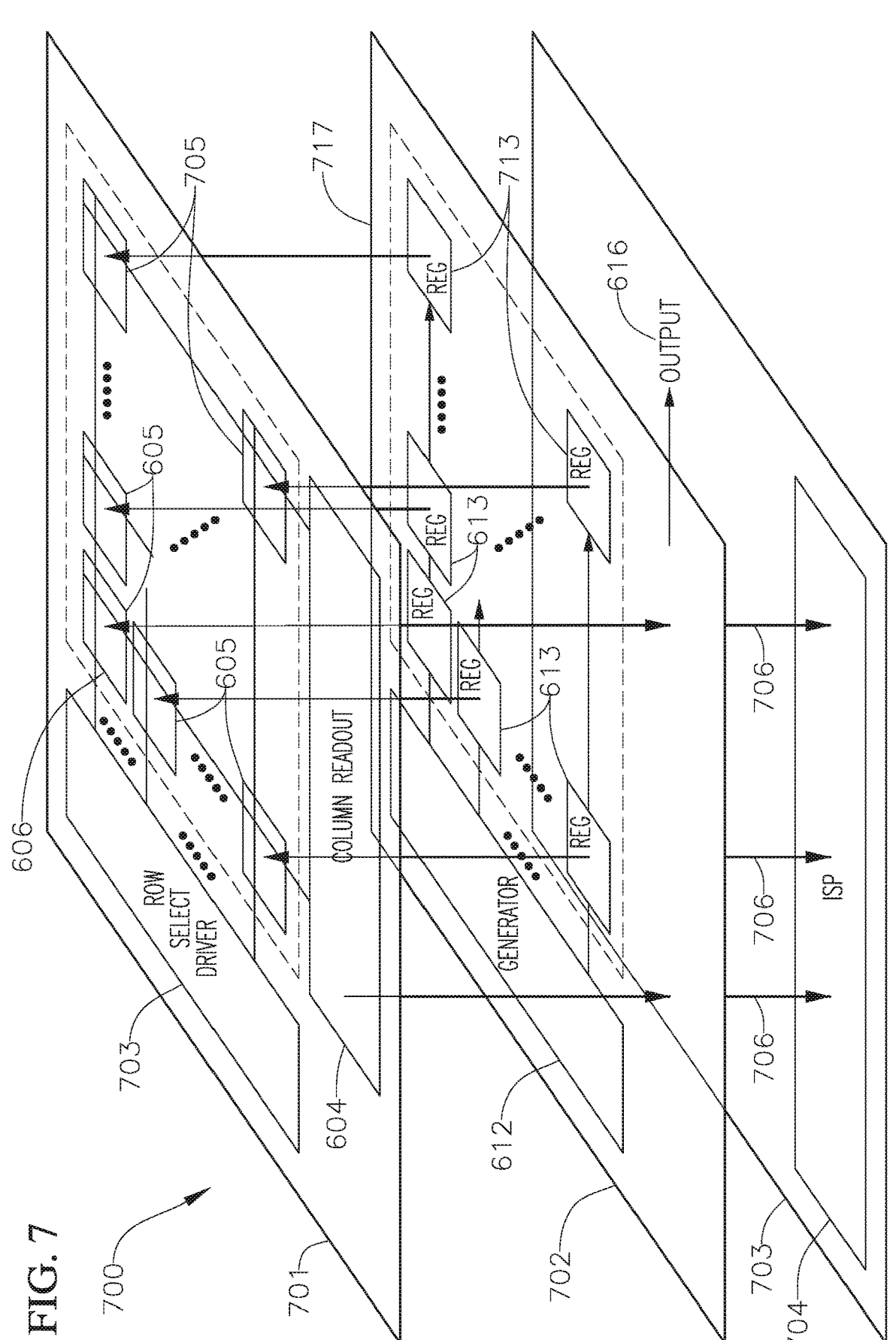
FIG. 7 depicts an architecture with three stacked die layers.

FIG. 7 depicts an architecture 700 with three stacked die layers. In an example embodiment, architecture 700 may use analog pixels/photodetectors, such as CIS, QIS, or CCD. FIG. 7 may include elements of FIG. 6A but some elements may be on different die layers.

There may be a first die layer 701 that may include a photodetector array 605, row select driver 603, and column readout 604. There may be a second layer 702 that may include a pattern generator 612 and register array 613. Finally, there may be a third layer 703 that may include an ISP 704, which may be ISP 615 of FIG. 6A.

There may be connectors 705 and 706 in architecture 700. Connector 705 may connect layer 701 and 702. Connector 706 may connect layer 702 and layer 703. Connectors 705 and 706 may be microbumps, micropillars, solder balls, hybrid bonding, or any other connection providing electrical contact.

FIGS. 6 and 7 show two- and three-layer options for analog pixels. There may be more die layers in alternate embodiments. Analog pixels may accumulate charge and the accumulated charge may be a voltage signal that may be converted into a digital signal (i.e. on or off, photodetection event occurred or did not occur). In additional to analog pixels, digital pixels may be used in a sensor. Digital pixels may include digital (on vs off, digital count) signals. For example, SPAD pixels may be used in a sensor. The following two figures show example digital pixel architectures with two and four layers. There may be a lot of similarity in operation and output, however, there may be some intermediary differences between sensor architectures for analog and digital pixels.

Figures 8A, 8B:
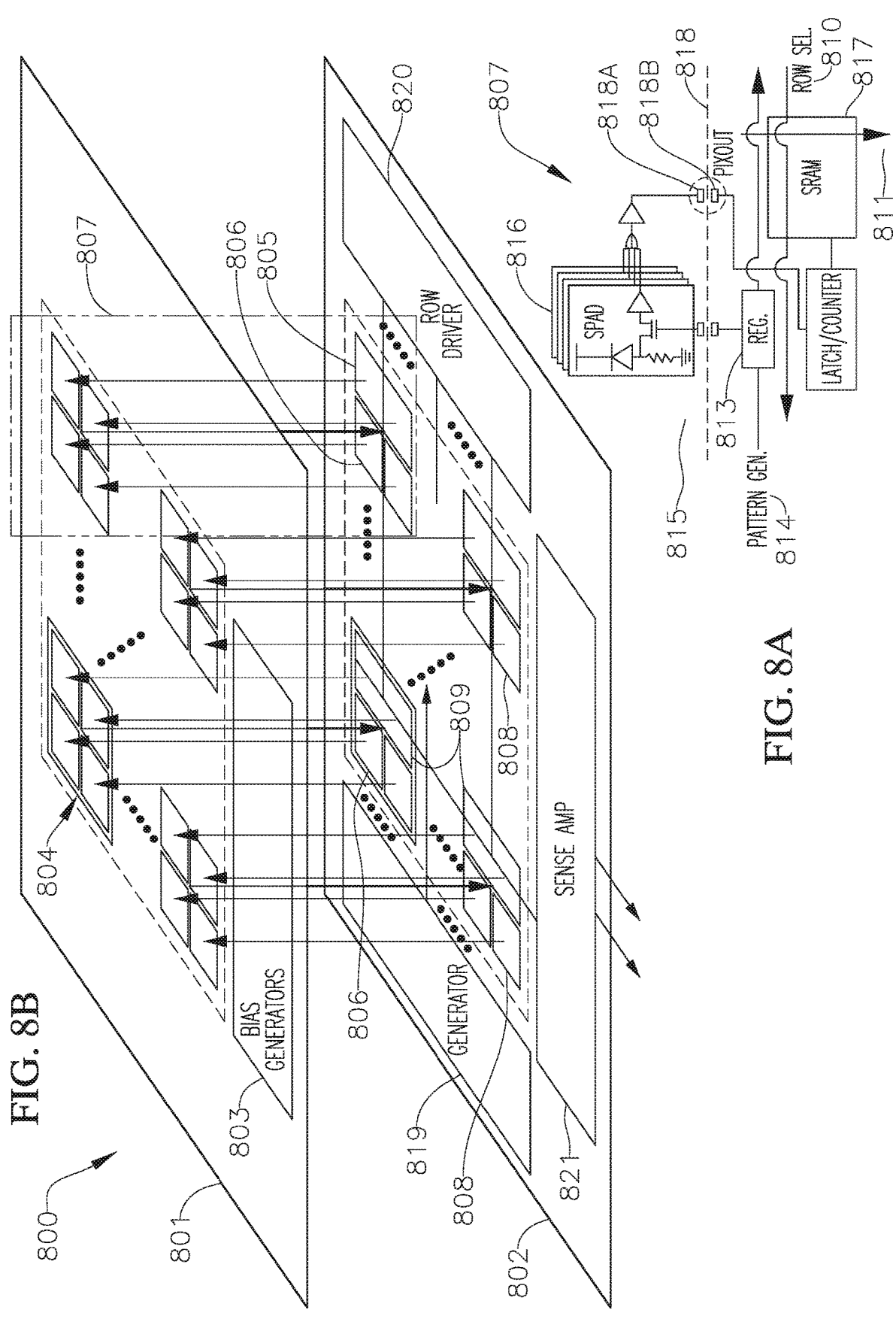
FIG. 8A depicts an example stacked architecture that may use digital pixels, such as SPADs.
FIG. 8B depicts a pixel that may be a pixel in FIG. 8A.

FIG. 8A depicts an example stacked architecture 800 that may use digital pixels, such as SPADs. Stacked architecture 800 may have two die layers, however, any number of layers may be used.

Stacked architecture 800 may have a first die layer 801 and a second die layer 802. First die layer 801 may be stacked on second die layer 802. First die layer 801 may include a bias generator 803 and a photodetector array 804. Bias generator 803 may generate different voltage or current references and may be used with photodetector array 804 for photodetection. There may be connectors 805 connecting first die layer 801 to second die layer 802. In some embodiments, there may microbumps, micropillars, solder balls, or hybrid bonding between the two layers 801 and 802, but any method for electrical connecting may be used.

Photodetector array 804 may be an array of photodetectors physically located on first die layer 801. There may be a register array 806 on the second die layer 802 that, together with photodetector array 804, may be part of a pixel array such as the pixel array 500 of FIG. 5. There may also be a latch array 808 and memory array 809 on the second die layer 802 that may be part of a pixel array. These elements will be described at the unit level in FIG. 8B with the pixel 807.

Moving back to the stacked architecture 800, second die layer 802 may include a pattern generator 819, register array 806, latch array 808, memory array 809, row driver 820, and sense amplifier 821. Pattern generator 819 may generate a shutter pattern that may be loaded into register array 806. In another embodiment, pattern generator 819 may receive a shutter pattern and then load the received shutter pattern values into register array 806.

Latch array 808 may accumulate additional counts from photodetectors in photodetector array 804. Memory array 809 may store photodetection values from photodetectors in photodetector array 804. Row driver 820 may select rows in photodetector array 804 that may be read out. Sense amplifier 821 may read out values of photodetector array 804 when row driver 820 selects rows of photodetectors.

Together, all elements in architecture 800 may form a more compact sensor compared to a single layer sensor architecture having similar components. By layering the elements on two or more layers, the photodetector array 804 may have a higher fill factor, which may allow for higher sensitivity to photodetection. There may be different process nodes for each element in architecture 800, or the process nodes may be the same. While architecture 800 shows two stacked layers, there may be more stacked layers.

Focusing on FIG. 8B, a pixel 807 may be a pixel in in the pixel array that may be configured physically in two layers: on first die layer 801 there may be photodetectors 816 and on second die layer 802 there may be register 813 housing data for shutter pattern 814, latch/counter 812, row select 810, shutter control signal 815, sense amplifier line 811, and memory 817. In some embodiments, pixel 807 may have alternate arrangements of components on first die layer 801 and other components on second die layer 802. There may also be connectors 818A and 818B. Connector 818A may be for the top die layer and connector 818B may be for the bottom die layer. Connector 818A and connector 818B may form an electrical connection between the two die layers 801 and 802 for pixel 807. In some embodiments, connectors 818A and 818B may be a microbumps, micropillars, solder balls, hybrid bond, or any other form of connection that allows for electrical contact between physical die layers.

Photodetectors 816 may be, for example, a 2×2 configuration of SPADs, that is, pixel 807 may be a shared pixel. Shutter pattern 814 may be an input into register 813. Register 813 may receive a shutter pattern 814 and may output a shutter control signal 815 that may control the charge accumulation of the four photodetectors 816. There may be one or more control signals 815 for each photodetector in photodetectors 816. A memory 817 may store values from photodetectors 816. In an example embodiment, memory 817 may be SRAM, but it may be any type of memory. A row select 810 may select pixel 816 for reading out, and a sense amplifier line 811 may be a column readout and read out from memory 817.

Figure 9:
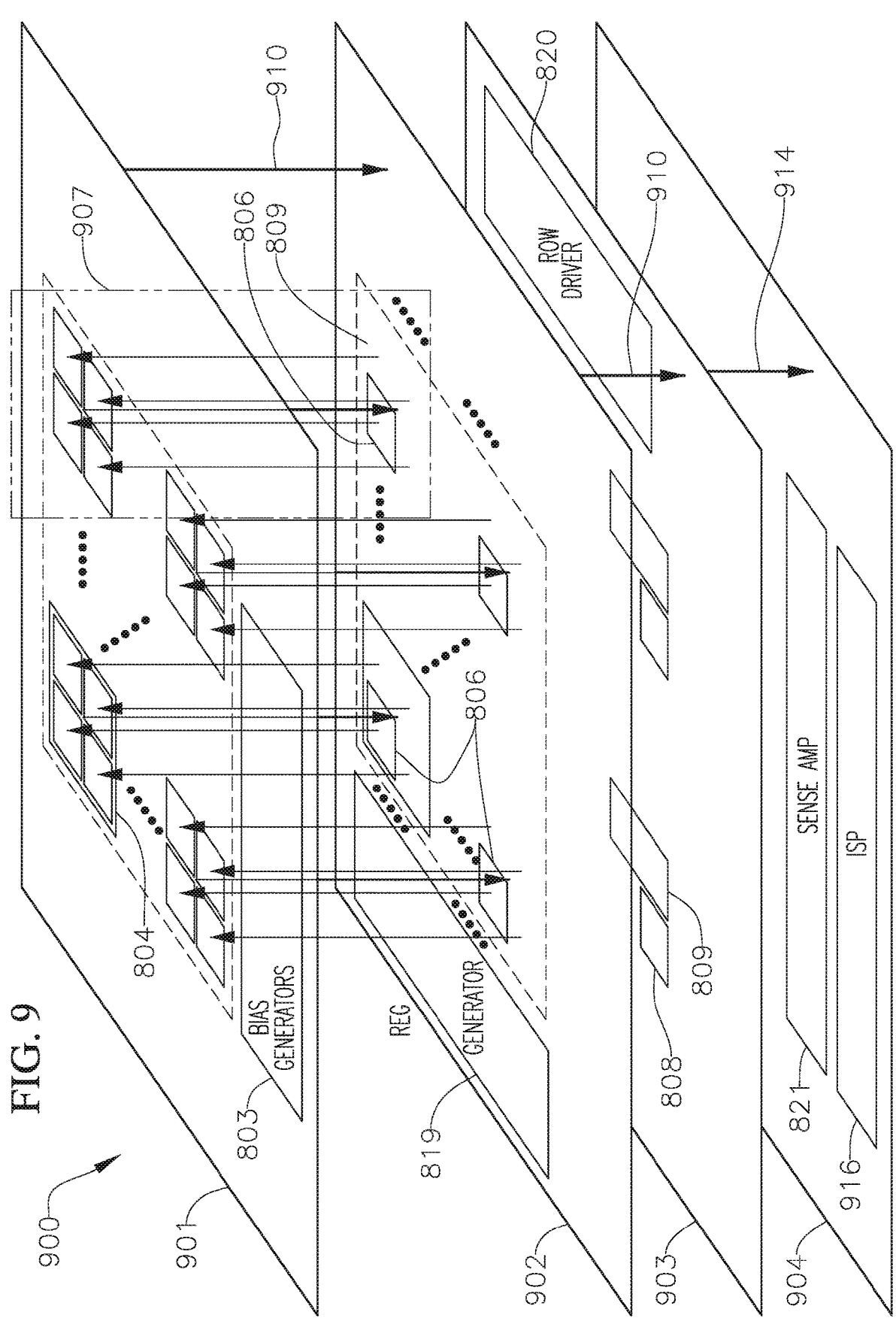
FIG. 9 shows an example stacked architecture.

FIG. 9 shows an example stacked architecture 900. Stacked architecture 900 may have the same elements of FIG. 8A but in a different configuration. As the shared elements may behave the same was as in FIG. 8A, they may not be described again in detail below. Stacked architecture 900 may be an example of a 3D stacking of four die layers and may use digital pixels/photodetectors, such as SPAD. In some embodiments, there may be four layers vertically stacked on each other. In other embodiments, some layers may be vertically stacked, while other layers may be adjacent in a horizontal location to the layer.

Stacked architecture 900 may have a first die layer 901. First die layer may include a photodetector array 804 and a bias generator 803. Photodetector array 804 may include photodetection elements capable of detecting wavelengths in the electromagnetic spectrum. In an example embodiment, photodetector array 804 may be able to detect visible light, however, other wavelength ranges may also be applicable in other embodiments. Bias generator 803 may be used to generate different voltage or current references for photodetectors in photodetector array 804. Bias generator 803 may also be found on a second die layer 902 or a third die layer 903, but it may be found on other die layers.

Stacked architecture 900 may have a second die layer 902. There may be connectors 907 electrically connecting first die layer 901 and second die layer 902. Second die layer 902 may include a pattern generator 819 and register array 806. Pattern generator 819 may generate a shutter pattern or it may receive a pre-loaded shutter pattern. Pattern generator 819 may send the shutter pattern to register array 806, which may use this information to enable or disable charge accumulation/photodetection in photodetector array 804.

There may be a third die layer 903. There may be connectors 910 electrically connecting second die layer 902 and third die layer 903. Third die layer 903 may include a memory array 809, a latch array 808, and a row driver 820. Memory array 809 may store values from photodetector array 804. Latch array 808 may accumulate additional counts from photodetector array 804. Row driver 820 may select rows of photodetector array 804 for reading out.

There may be a fourth die layer 904. There may be connectors 914 electrically connecting third die layer 903 and fourth die layer 904. Fourth die layer 904 may include a sense amplifier 821 and an ISP 916. Sense amplifier 821 may be used in conjunction with row driver 820 to read out values from memory array 809. ISP 916 may be used for processing the read out values of in memory array 809.

Figure 10:
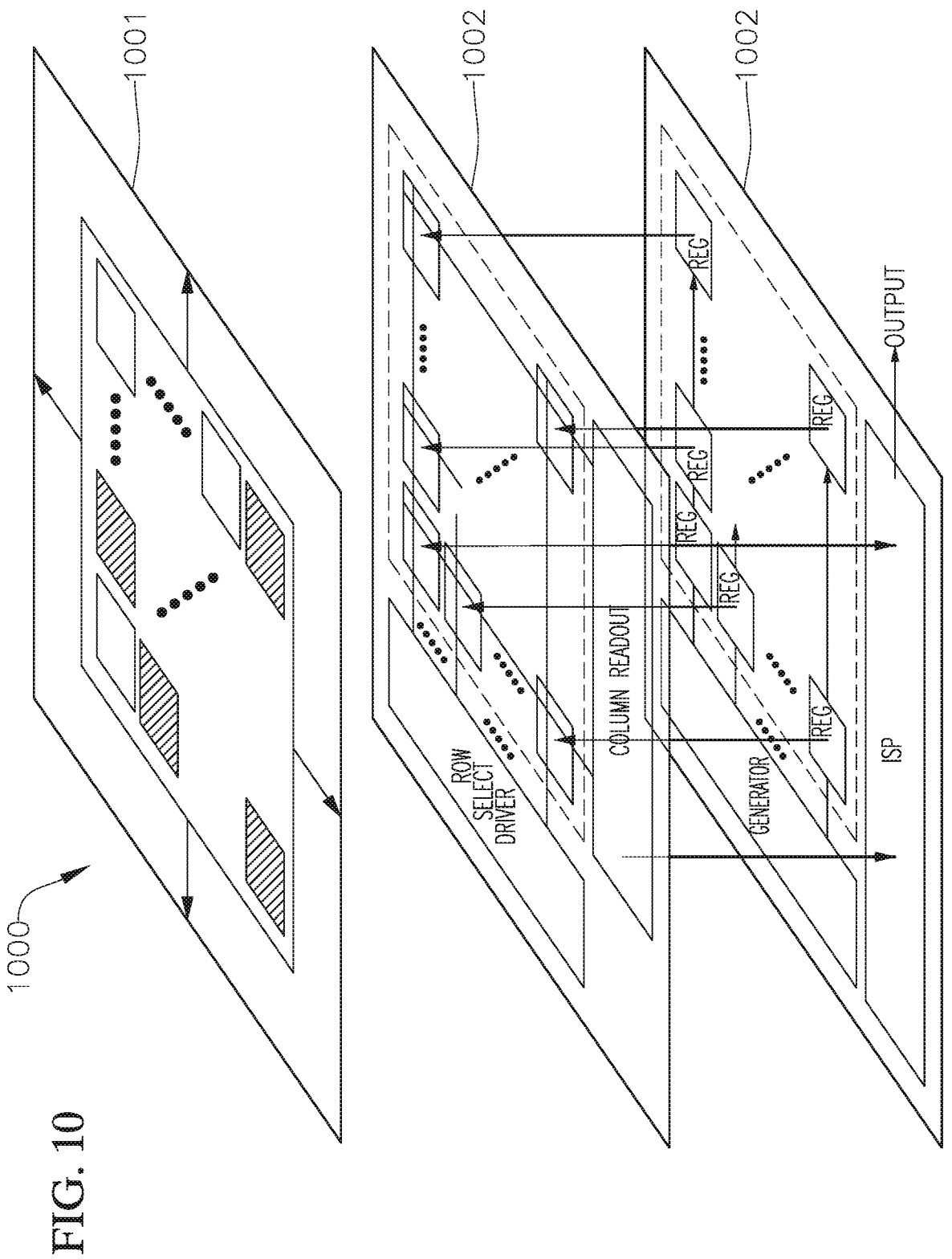
FIG. 10 depicts an example architecture combined optical mask with an electrical shutter pattern.

The above example embodiments in FIGS. 6-9 may use pattern generators to either generate or load a shutter pattern. This shutter pattern may be an electrical shutter. In some embodiments, an optical mask can be used in place of or combined with an electrical shutter. FIG. 10 depicts an example architecture 1000 combined optical mask with an electrical shutter pattern. There may be an optical mask 1001 on top of sensor architecture 1002. Optical mask 1001 may be a liquid crystal, but may be any other type of mask that can block photodetection. For example, optical mask 1001 may have an array of MEMS actuators to precisely control the passing or blocking of light onto each photodetector in a photodetector array.

When performing imaging, both the optical mask 1001 and the digital shutter pattern (not shown) of sensor architecture 1002 may be used, or one of the two may be disabled while the other is used.

Figure 11:
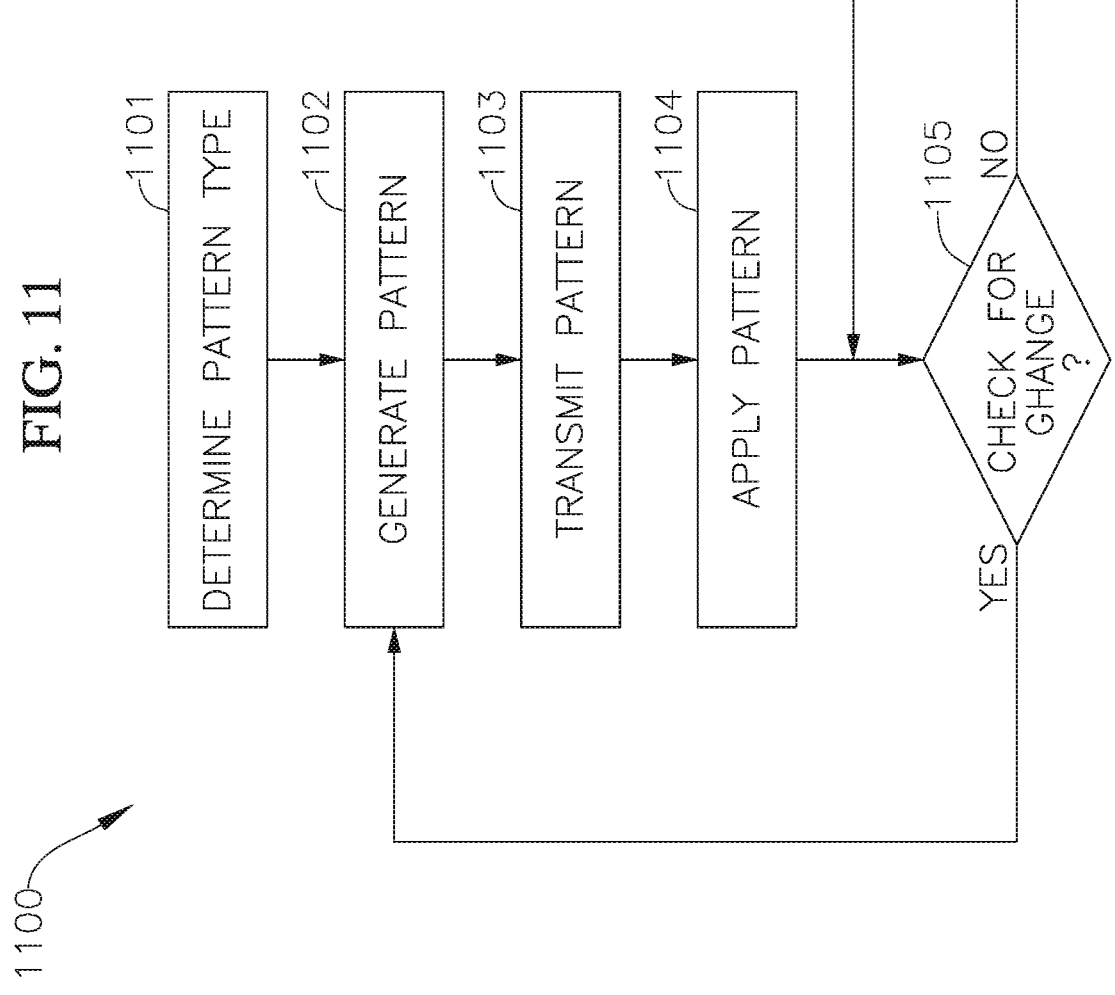
FIG. 11 depicts a process for shutter generation.

The above example embodiments in FIGS. 6-10 may all generate a shutter pattern to be used for imaging. FIG. 11 depicts a process 1100 for shutter generation.

Process 1101 may be determining shutter pattern type. As described previously, there may be spatial, temporal, spatial-temporal, or a combined optical mask and electrical shutter pattern options. In the combined optical mask and electrical shutter pattern options, the optical mask portion may be able to use the spatial compression option and the electrical shutter pattern portion can be any type (including being disabled).

Process 1102 may generate the shutter pattern chosen in step 1101. The shutter pattern may be generated on chip or off chip, that is, it may be generated online or preloaded for use. On chip shutter generation may be done with a pseudo-random number generator. Off chip shutter generation may be done by a computer and then loaded into a memory on chip.

Process 1103 may be to transmit the shutter pattern generated from process 1102. Transmitting a shutter pattern may be sent from a pattern generator to a register array. The register array may propagate the shutter pattern sequentially or in any order. For example, in the first row, the shutter pattern may be received by the first register and then the pattern may propagate to the second, third, and subsequent registers in the row until all registers are loaded with a shutter pattern. In an example embodiment, if there are four columns of registers, it may take four clock cycles for a shutter pattern to be fully loaded into a register array.

Process 1104 may be to apply the loaded shutter pattern onto a photodetector array. Shutter pattern values may be binary (1 or 0) and may enable or disable charge accumulation in a photodetector. In some embodiments, there may be one shutter pattern value per photodetector. In other embodiments, there may be one shutter value pattern shared between two or more photodetectors.

Process 1105 may be to check for a new shutter pattern to be generated. A new shutter pattern may be generated as often as once per clock cycle, but it may be slower, such as once per two clock cycles or more. If there is no change to the new shutter pattern, the same shutter pattern may remain or the shutter pattern that was applied to the register array may be cleared, that is, all photodetectors may be used for imaging. If there is a change to the new shutter pattern, process 1105 may loop back to process 1102.

The result of process 1100 may lead to reading out of photodetector values from a photodetector array. As described previously, a row select may select rows for reading out, and a column readout may readout selected rows for each column. An ISP may process the read out data and perform decompression or other image processing tasks.

Figure 12:
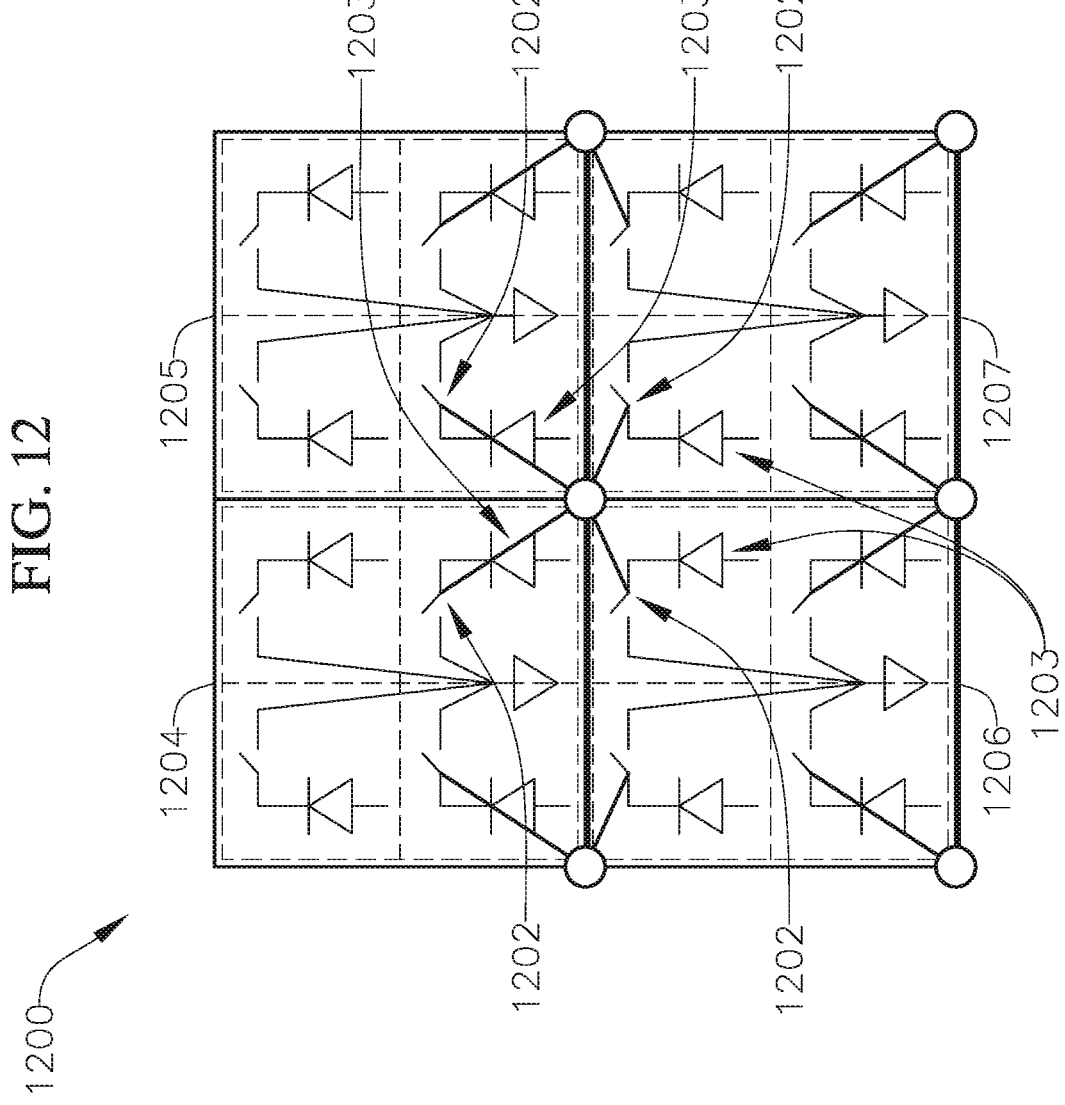
FIG. 12 depicts an alternate embodiment where photodetectors may share a register.

As described previously, registers may share control signal values with multiple photodetectors. FIG. 12 depicts an alternate embodiment where photodetectors may share a register.

There may be a pixel array 1200. In the example of FIG. 12, pixel array 1200 may be a 4×4 array of pixels. Pixel array 1200 may have a shared register configuration.

Shift register 1201, for example, may send one control signal to a switch set 1202. Switch set 1202 be switches configured to enable or disable charge accumulate for a photodetector set 1203. Photodetector set 1203 may be four photodetectors. Shift register 1201 may be found on a lower die layer, such as second die layer 602 of FIG. 6A. Photodetector set 1203 and switch set 1202 may be found on a higher die layer, such as first die layer 601 of FIG. 6A. Together, this configuration may enable easier routing in three dimensions as the configuration may be more compact than if all elements were found on a single die layer. Other combinations of elements may exist, such as shift register 1201 and switch set 1202 being on one a lower die layer and photodetector set 1203 being on a higher die layer.

Pixel array 1200 may be used when a spatial-temporal compression option is used. For example, there may be four 2×2 pixel subsets 1204, 1205, 1206, and 1207. During the spatial part of a spatial-temporal compression, each 2×2 subset may result in one output value. Shift register 1201 may be able to send one value to one of the four registers in each pixel subset 1204-1207. Similarly, there may be three other registers (not shown) per pixel subset 1204-1207 to send shutter values to the associated switches that may control charge accumulation in the other photodetectors in each pixel subset 1204-1207.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

Embodiments of the inventive concept may extend to the following statements, without limitation:

Statement 1: A sensor, comprising: a photodetector array located on a first die layer, a register array located on a second die layer, a row select driver, a column readout, a pattern generator, an image signal processor, wherein the first die layer is stacked on the second die layer.

Statement 2: The sensor of statement 1, wherein the photodetector array comprises at least one of a photodiode, SPAD, CIS, QIS, or CCD.

Statement 3: The sensor of statement 1, wherein the row select driver is located on the first die layer.

Statement 4: The sensor of statement 1, wherein the column readout is located on the first die layer.

Statement 5: The sensor of statement 1, wherein the pattern generator is located on the second die layer.

Statement 6: The sensor of statement 1, wherein the image signal processor is located on the second die layer.

Statement 7: The sensor of statement 1, wherein at least one register in the register array outputs one control signal to one photodetector in the photodetector array.

Statement 8: The sensor of statement 1, wherein at least one register in the register array outputs one control signal to two or more photodetectors in the photodetector array.

Statement 9: The sensor of statement 1, wherein the sensor further comprises an optical mask that is located vertically above the first die layer.

Statement 10: The sensor of statement 1, wherein the sensor further comprises a third layer and has at least one of a pattern generator, register array, image signal processor, or memory located on the third layer.

Statement 11: The sensor of statement 1, wherein the first die layer and the second die layer are electrically connected with microbumps, micropillars, solder balls or hybrid bonding.

Statement 12: A method for imaging, comprising: generating a shutter pattern on a first die layer, sending the shutter pattern to a register array on the first die layer, outputting control signal values from the register array to switches in a photodetector array on a second die layer, enabling charge accumulation in photodetectors in the photodetector array when the control signal values are set to enable, disabling charge accumulation in photodetectors in the photodetector array when the control signal value are set to disable, and reading out the accumulated charge values on the first die layer.

Statement 13: The method of statement 12, wherein the enabled charge accumulation is stored in a first memory on the first die layer.

Statement 14: The method of statement 12, wherein the reading out of the accumulated charge values on the first die layer further comprises selecting at least one row of a photodetector array and sending the values of the selected at least one row to a column readout on the second die layer.

Statement 15: The method of statement 12, wherein sending the shutter pattern to the register array on the first die layer further comprises: receiving part of the shutter pattern in a first register associated with a first pixel during a first clock cycle, and sending the part of the shutter pattern from the first register to a second register associated with a second pixel during a second clock cycle.

Statement 16: The method of statement 15, wherein the speed of the clock cycle may be the product of a compression ratio and a frame rate.

Statement 17: A sensor, comprising: a photodetector array on a first die layer, a register array on a second die layer, a memory array, an image signal processor, a row driver, a pattern generator, and a column readout, wherein the first die layer and second die layer are vertically stacked.

Statement 18: The sensor of statement 17, wherein the memory array is on the second die layer or a third die layer.

Statement 19: The sensor of statement 17, wherein the image signal processor is on the second die layer, third die layer, or a fourth die layer.

Statement 20: The sensor of statement 17, wherein the pattern generator is on the second die layer or third die layer.

Statement 21: The sensor of statement 17, wherein the sensor further comprises a memory array and a latch array that are on the second die layer, third die layer, or fourth die layer.

Statement 22: The sensor of statement 17, wherein the first die layer and the second die layer are electrically connected with microbumps, micropillars, solder balls or hybrid bonding.

What is claimed is:

1. A sensor, comprising:
a photodetector array located on a first die layer,
a register array located on a second die layer,
a row select driver,
a column readout,
a pattern generator, and
an image signal processor,
wherein the first die layer is stacked on the second die layer; and
wherein a first register of the register array associated with a first pixel receives a part of a shutter pattern during a first clock cycle, and the first register sends the part of the shutter pattern to a second register of the register array associated with a second pixel during a second clock cycle.

2. The sensor of claim 1, wherein the photodetector array comprises at least one of a photodiode, SPAD, CIS, QIS, or CCD.

3. The sensor of claim 1, wherein the row select driver is located on the first die layer.

4. The sensor of claim 1, wherein the column readout is located on the first die layer.

5. The sensor of claim 1, wherein the pattern generator is located on the second die layer.

6. The sensor of claim 1, wherein the image signal processor is located on the second die layer.

7. The sensor of claim 1, wherein at least one register in the register array outputs one control signal to one photodetector in the photodetector array.

8. The sensor of claim 1, wherein at least one register in the register array outputs one control signal to two or more photodetectors in the photodetector array.

9. The sensor of claim 1, wherein the sensor further comprises a third layer and has at least one of a pattern generator, register array, image signal processor, or memory located on the third layer.

10. The sensor of claim 1, wherein the first die layer and the second die layer are electrically connected with microbumps, micropillars, solder balls or hybrid bonding.

11. A method for imaging, comprising:
generating a shutter pattern on a die layer,
sending the shutter pattern to a register array on the die layer,
outputting control signal values from the register array to switches in a photodetector array on an another die layer,
enabling charge accumulation in photodetectors in the photodetector array when the control signal values are set to enable, disabling charge accumulation in photodetectors in the photodetector array when the control signal value are set to disable, and reading out the accumulated charge values on the die layer;

wherein sending the shutter pattern to the register array on the die layer further comprises:

receiving a part of the shutter pattern in a first register associated with a first pixel during a first clock cycle, and sending the part of the shutter pattern from the first register to a second register associated with a second pixel during a second clock cycle.

12. The method of claim 11, wherein the enabled charge accumulation is stored in a first memory on the die layer.

13. The method of claim 11, wherein the reading out of the accumulated charge values on the-die layer further comprises selecting at least one row of a photodetector array and sending the values of the selected at least one row to a column readout on the another die layer.

14. The method of claim 11, wherein the speed of the clock cycle may be the product of a compression ratio and a frame rate.

15. A sensor, comprising:

a photodetector array on a first die layer, a register array on a second die layer, a memory array, an image signal processor, a row driver, a pattern generator, and a column readout, wherein the first die layer and second die layer are vertically stacked; and wherein a first register of the register array associated with a first pixel receives a part of a shutter pattern during a first clock cycle, and the first register sends the part of the shutter pattern to a second register of the register array associated with a second pixel during a second clock cycle.

16. The sensor of claim 15, wherein the memory array is on the second die layer or a third die layer.

17. The sensor of claim 15, wherein the image signal processor is on the second die layer, third die layer, or a fourth die layer.

18. The sensor of claim 15, wherein the pattern generator is on the second die layer or third die layer.

19. The sensor of claim 15, wherein the sensor further comprises a memory array and a latch array that are on the second die layer, third die layer, or fourth die layer.

20. The sensor of claim 15, wherein the first die layer and the second die layer are electrically connected with microbumps, micropillars, solder balls or hybrid bonding.

* * * * *